Aug. 19, 1958   C. C. HALBERSTADT   2,848,035
APPARATUS FOR EJECTING ARTICLES FROM A PRESS
Filed Jan. 24, 1955                 9 Sheets-Sheet 1
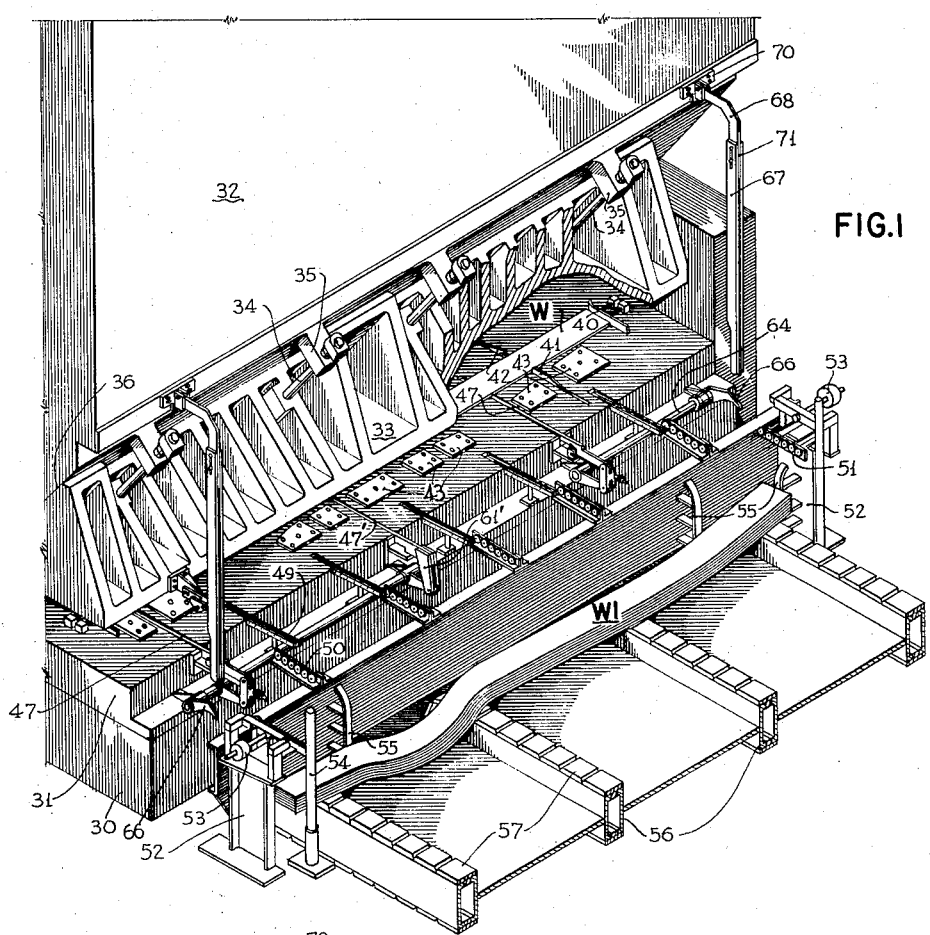
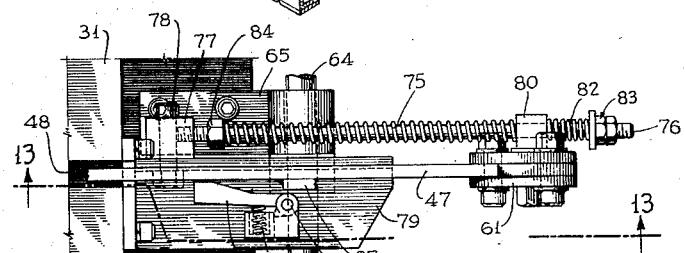
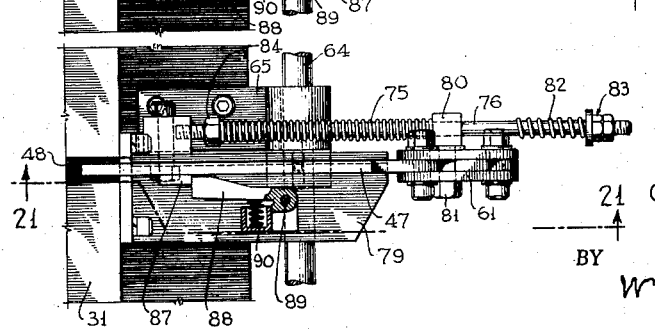
INVENTOR
Charles C. Halberstadt
BY
Wm. R. Glisson
ATTORNEY Aug. 19, 1958 C. C. HALBERSTADT 2,848,035
APPARATUS FOR EJECTING ARTICLES FROM A PRESS
Filed Jan. 24, 1955 9 Sheets-Sheet 3
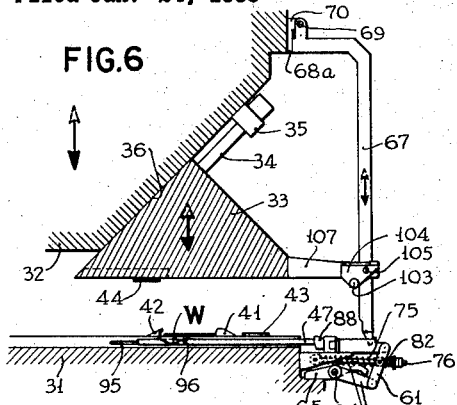
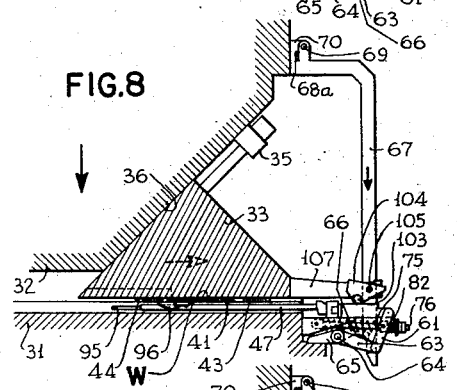
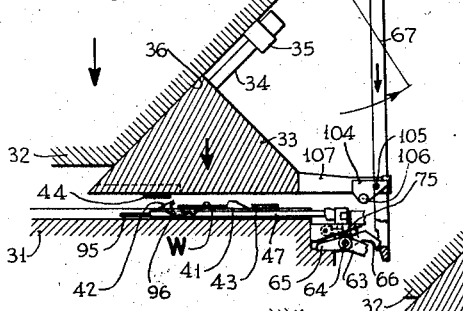
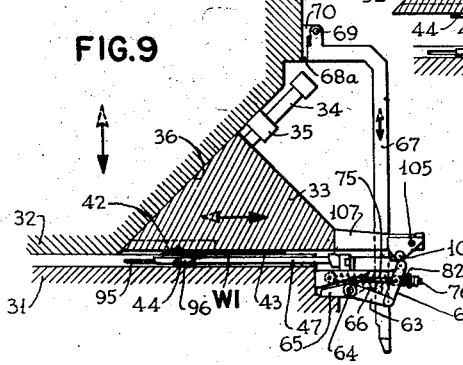
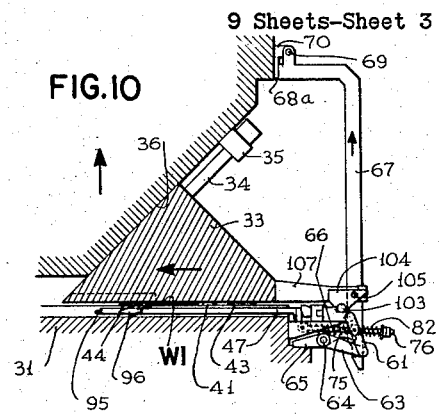
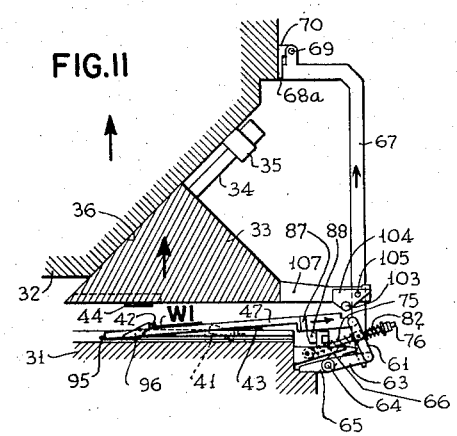
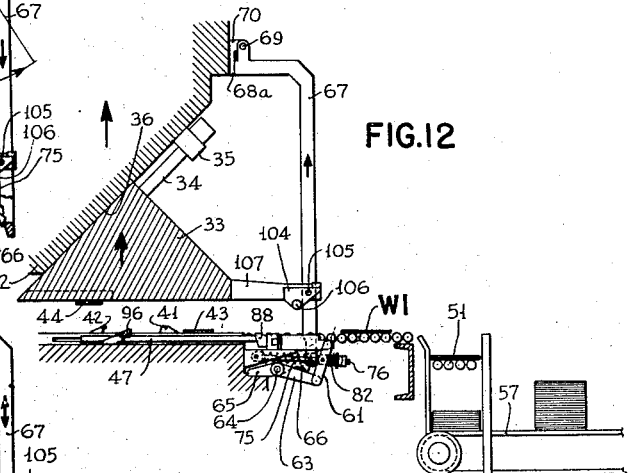
INVENTOR
Charles C. Halberstadt
BY
Wm. R. Glisson
ATTORNEY

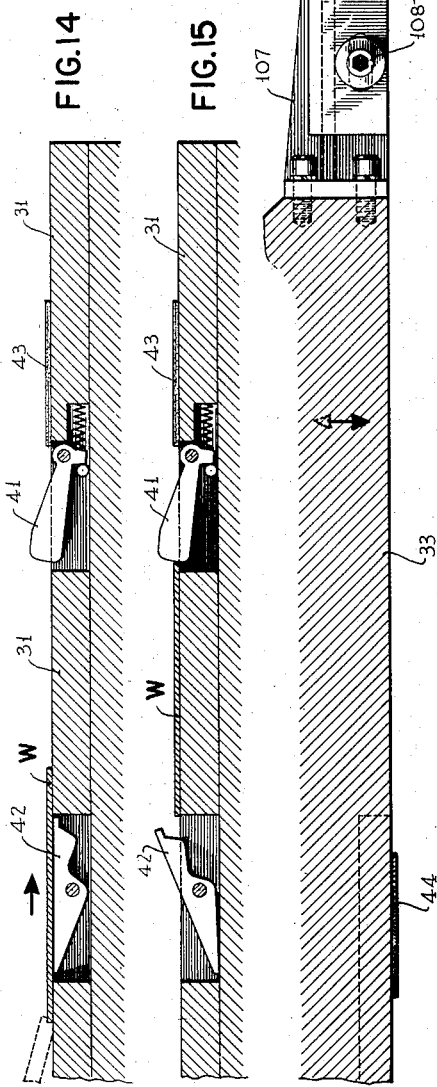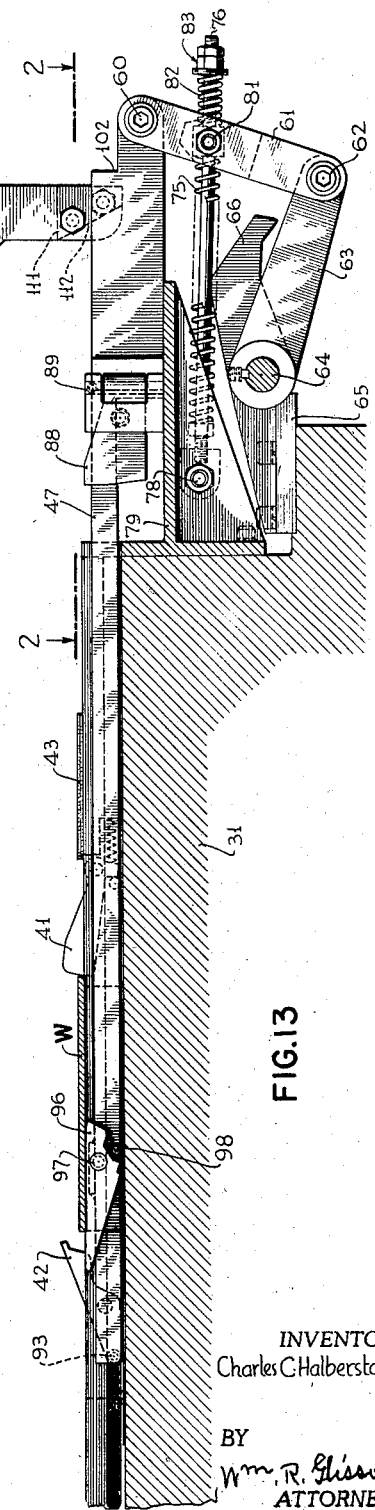

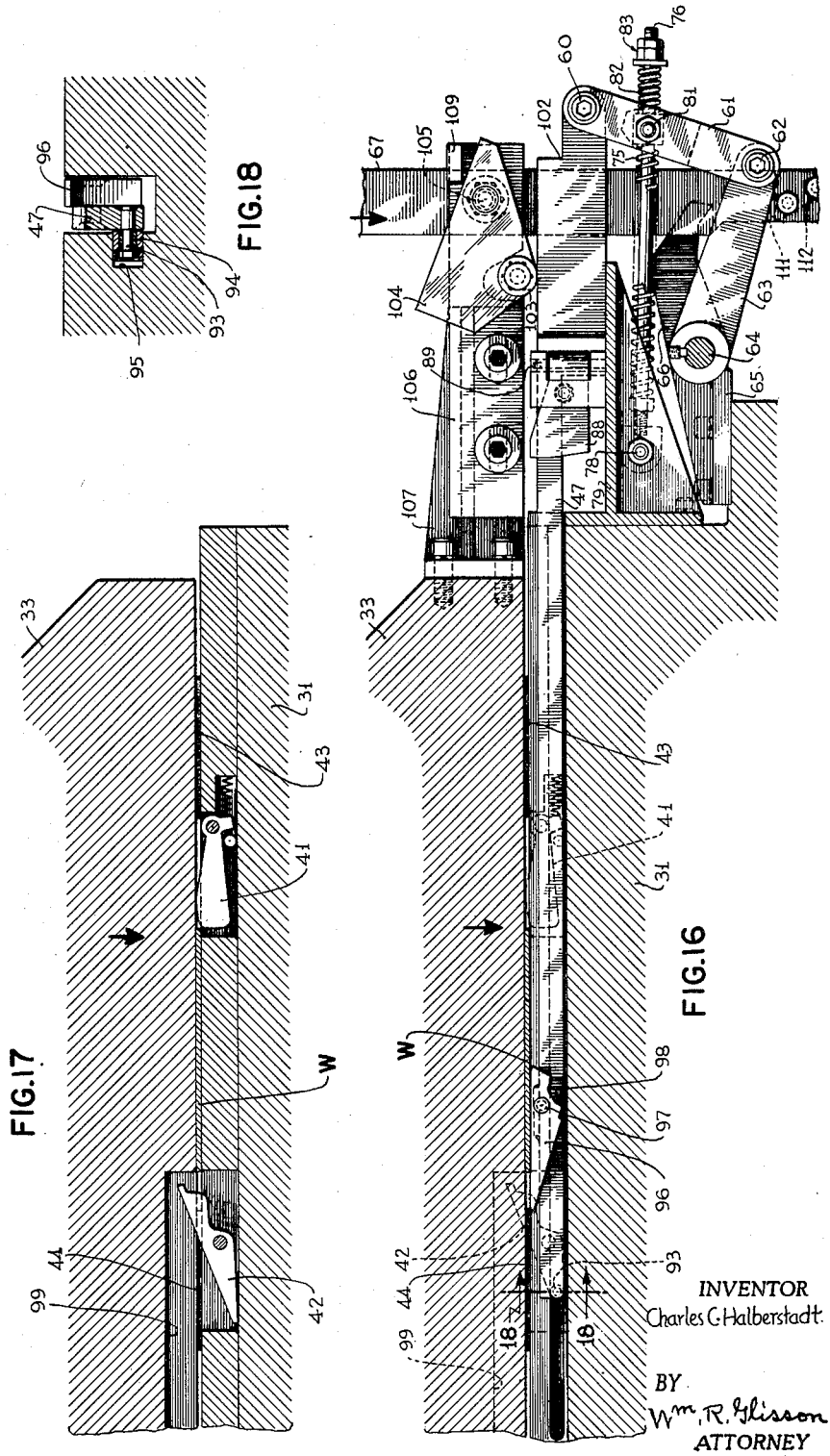

Aug. 19, 1958 C. C. HALBERSTADT 2,848,035
APPARATUS FOR EJECTING ARTICLES FROM A PRESS
Filed Jan. 24, 1955 9 Sheets-Sheet 6
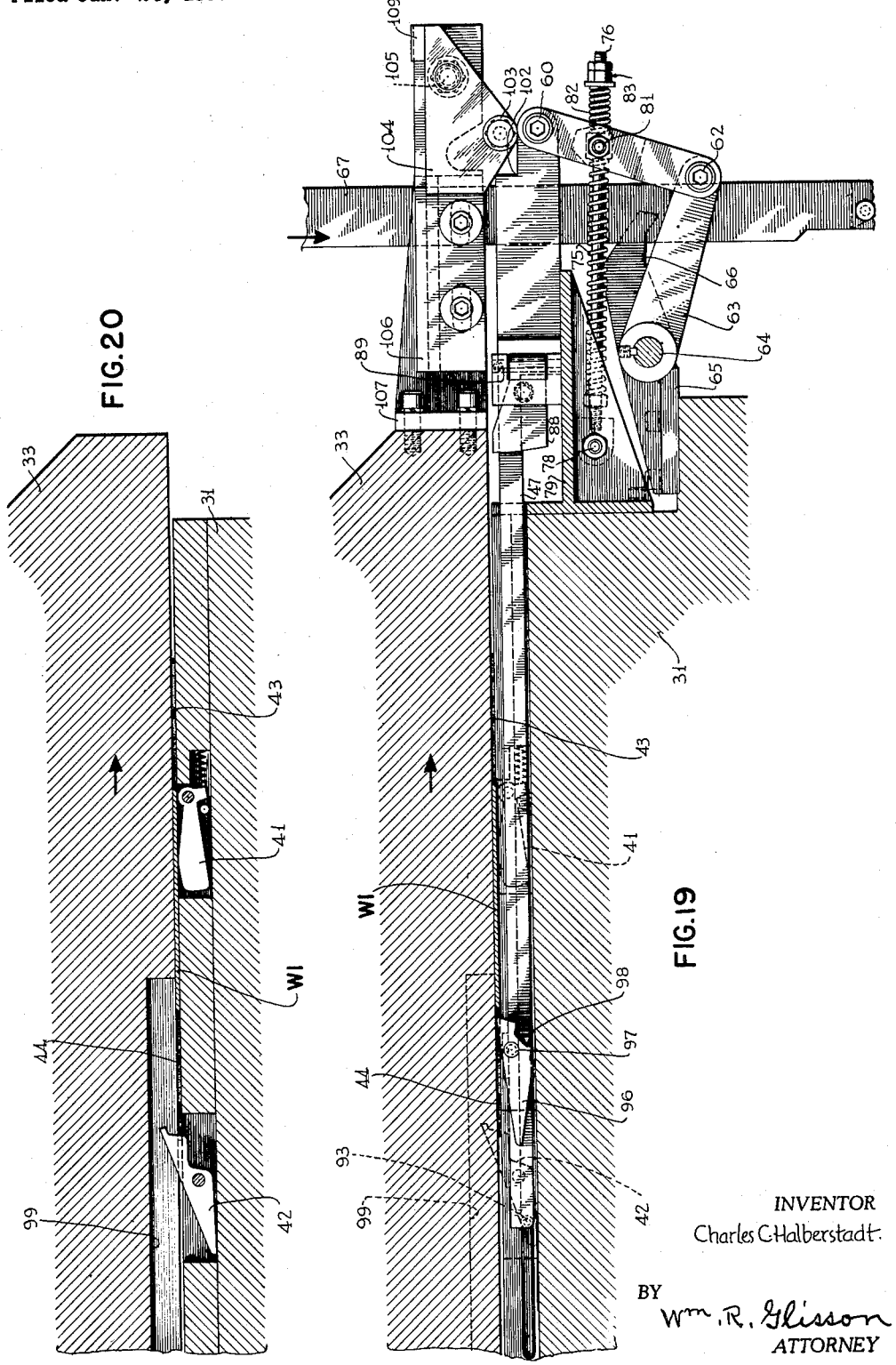
INVENTOR
Charles C. Halberstadt.
BY Wm. R. Glisson
ATTORNEY Aug. 19, 1958  C. C. HALBERSTADT  2,848,035
APPARATUS FOR EJECTING ARTICLES FROM A PRESS
Filed Jan. 24, 1955  9 Sheets-Sheet 7
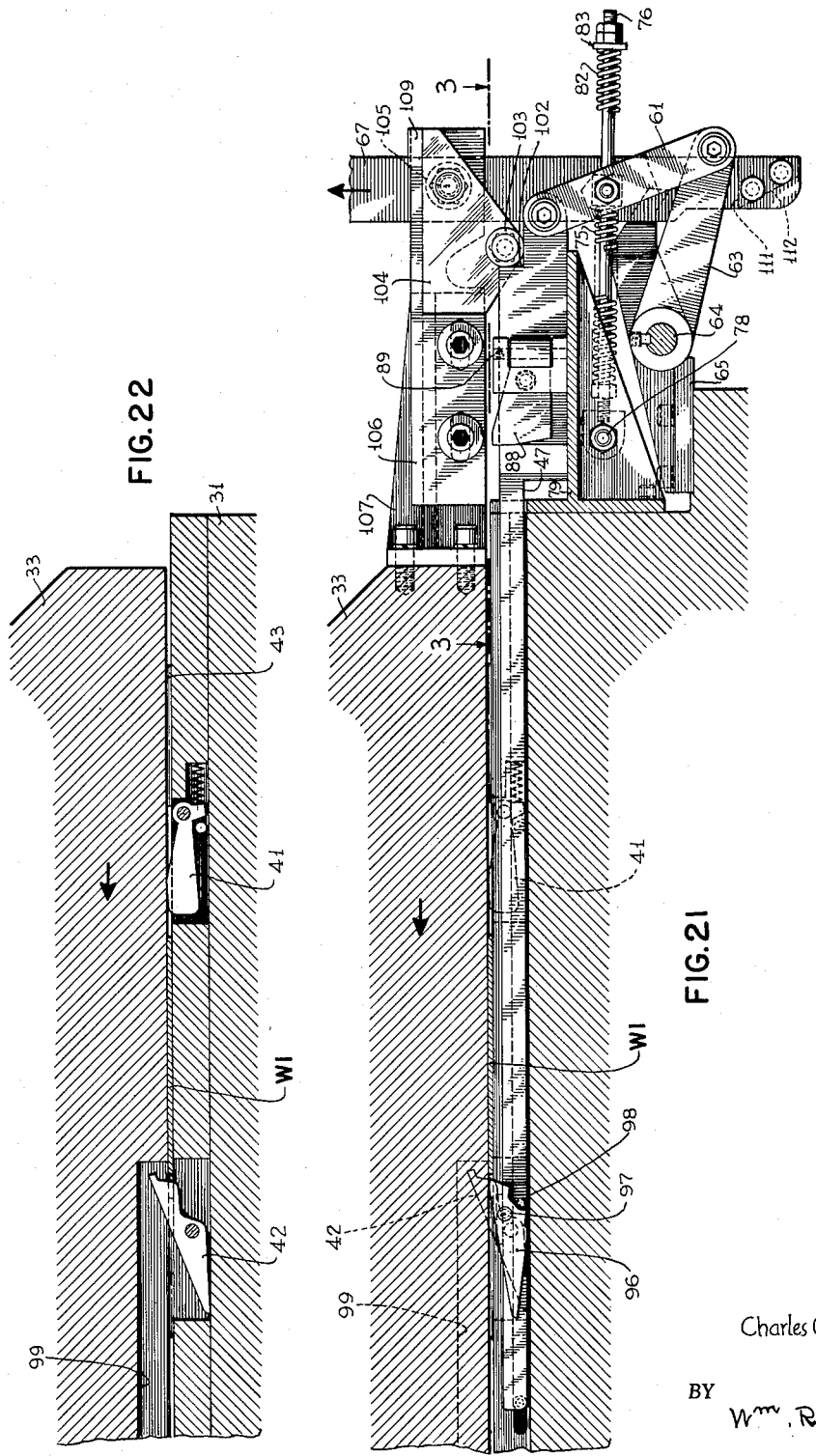
INVENTOR
Charles C. Halberstadt
BY Wm. R. Glisson
ATTORNEY

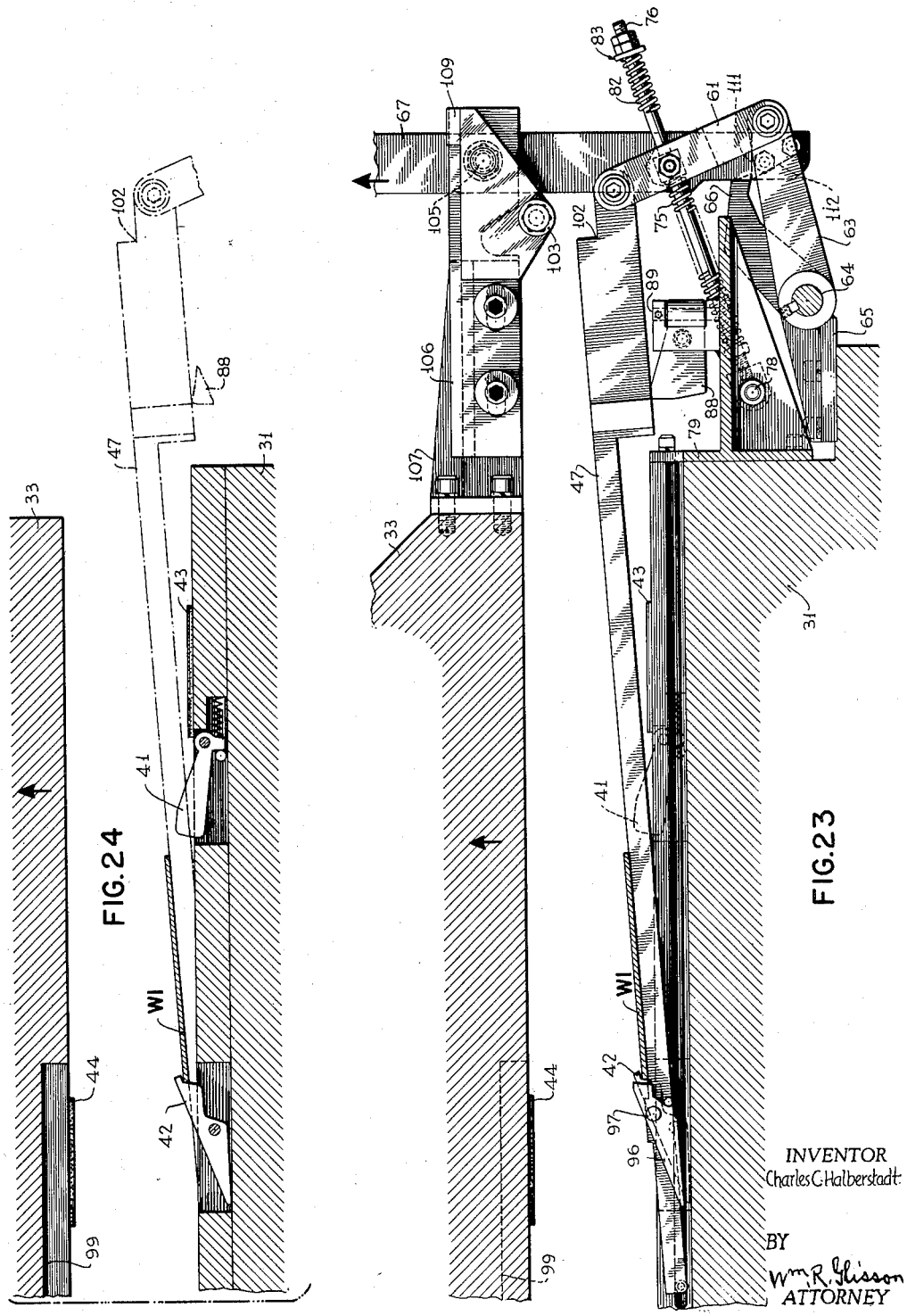

Aug. 19, 1958  C. C. HALBERSTADT  2,848,035
APPARATUS FOR EJECTING ARTICLES FROM A PRESS
Filed Jan. 24, 1955  9 Sheets-Sheet 9

INVENTOR
Charles C. Halberstadt
BY
Wm. R. Glisson
ATTORNEY

United States Patent Office 2,848,035
Patented Aug. 19, 1958

2,848,035

APPARATUS FOR EJECTING ARTICLES FROM A PRESS

Charles C. Halberstadt, Gladwyne, Pa., assignor to The Budd Company, Philadelphia, Pa., a corporation of Pennsylvania Application January 24, 1955, Serial No. 483,693

4 Claims. (Cl. 153—48)

This invention relates to apparatus for ejecting articles from a press and has for an object the provision of improvements in this art.

One of the particular objects of the invention is to provide article ejecting means operated by and in coordination with the press mechanism, specifically by the ram and related parts.

Another object is to provide article ejecting means which acts rapidly and effectively to eject an article as the press parts are separating.

Another object is to provide an ejector which moves the article clear of press parts prior to ejecting it.

Another object is to provide article-ejecting mechanism which does not interfere with the feed-in of a new workpiece during the time the press is open.

Another object is to provide, in an edge-bending press, article-ejecting mechanism which is actuated partly by the edgewise moving part of the die and partly by the ram.

Another object is to provide ejecting mechanism which is charged with ejecting energy at one part of the press movement and which has the energy released to eject an article at another part of the press movement.

The above and other objects and novel features of the invention will be apparent from the following description of an exemplary embodiment, reference being made to the accompanying drawings, wherein:

Fig. 1 is an isometric front elevation of an edge-bending press, showing the ejecting and stacking mechanism;

Fig. 2 is an enlarged plan view of part of the ejecting mechanism prior to having energy stored therein, the view being taken on the line 2—2 of Fig. 13;

Fig. 3 is a view like Fig. 2 taken after the energy-storing action has been completed;

Fig. 6 is a diagrammatic view in vertical section and elevation showing the dies in fully open position, the ram being raised and the edge-bending or closing-in die part being in its lowermost position on the ram;

Fig. 7 is a diagram similar to Fig. 6 showing the release rod passing the ejector tripping arm;

Fig. 8 is a diagram similar to Fig. 6 showing the edge-bending die part seated on the lower die and workpiece ready to start the edge-bending action;

Fig. 9 is a diagram similar to Fig. 6 showing the parts at the end of the edge-bending stroke, the edge-bending die part having reached its highest position with relation to the ram;

Fig. 10 is a diagram similar to Fig. 6 showing the parts as the ram starts to rise causing the edge-bending die part to move laterally to store energy in the ejecting mechanism;

Fig. 11 is a diagram similar to Fig. 6 showing the ram raised further and the edge-bending die part in its lowermost position relative thereto and the ejecting mechanism ready for release;

Fig. 12 is a diagram similar to Fig. 6 showing the parts after the workpiece has been ejected;

Fig. 13 is an enlarged vertical section, taken on the line 13—13 of Fig. 2, showing the parts in a position corresponding to that of Fig. 6;

Fig. 14 is a section like part of Fig. 13 showing a workpiece being fed in upon the lower die;

Fig. 15 is a view like Fig. 14 showing the workpiece fully inserted as in Fig. 13;

Fig. 16 is a section similar to Fig. 13 but showing the parts in the same position as in Fig. 8;

Fig. 17 is a section line part of Fig. 16 but showing the parts in full lines;

Fig. 18 is an enlarged detail section taken on the line 18—18 of Fig. 16;

Fig. 19 is a section similar to Fig. 13 but showing the parts in the same position as in Fig. 9;

Fig. 20 is a section like part of Fig. 19 but showing the workpiece positioning devices in full lines;

Fig. 21 is a section similar to Fig. 13 but showing the parts in the same position as in Fig. 10;

Fig. 22 is a section like part of Fig. 21 but showing the workpiece positioning devices in full lines;

Fig. 23 is a section similar to Fig. 13 but showing the parts in the same position as in Fig. 11;

Fig. 24 is a section like part of Fig. 23 but showing the workpiece positioning devices in full lines;

Figure 4:
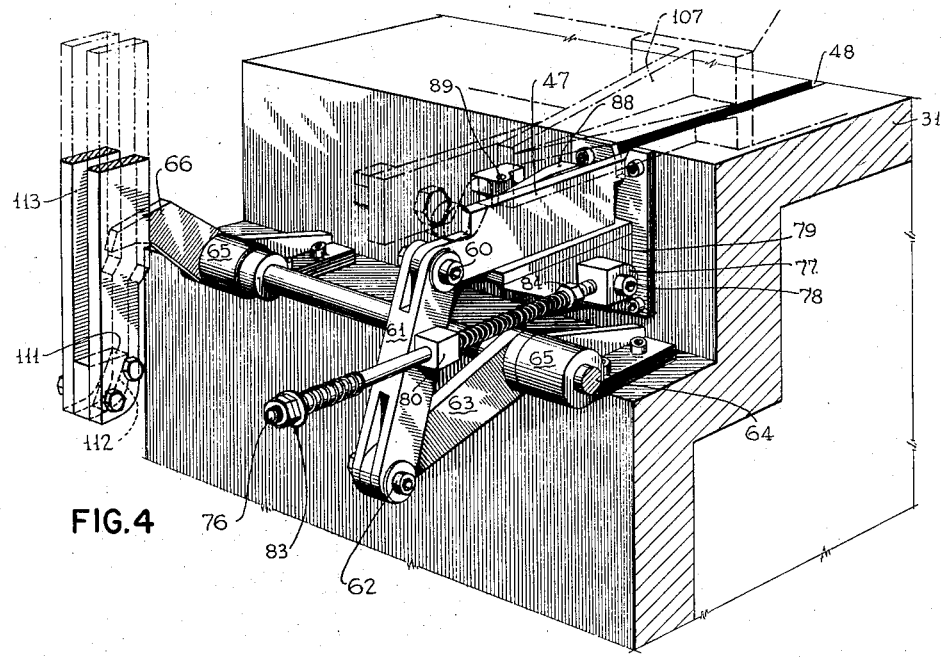
Fig. 4 is an enlarged perspective elevation of parts of the ejecting mechanism and press, the parts being shown ready for release to discharge a workpiece.

As shown in Fig. 1, the press with which the present invention has been shown is adapted to edge-bend a workpiece W, such for example as a sheet or plate to be formed into a chassis side sill, into the shape W1.

The press comprises a base 30 carrying a lower die 31 and a reciprocable ram or plunger 32 carrying an edge-bending die part 33, as by inclined rods 34 slidable in inclined guides 35, so as to have both vertical and horizontal movement relative to the ram. The die part 33 slides along an inclined face 36 of the ram. Edge-bending presses of this type are well known.

The lower die is provided with end guides 40 for holding the workpiece at its ends, front guides or stops 41 near the ends for holding the front edge when the workpiece is fed in, and rear guides or positioning elements 42 for assuring that the workpiece has been fed in far enough and for cooperating with the ejecting mechanism in a manner to be explained hereinafter. The front and rear guides are pivotally mounted in slots in the lower die so as to swing down out of the way when necessary. Both of the positioning members 41 and 42 are urged upward, as by springs, and are limited in their upward movement by suitable stops, as shown in Figs. 14 and 15.

The lower die is provided with a plurality of forming pads 43 and, as seen in Fig. 13 and elsewhere, the upper die part 33 is provided with similar forming pads 44 which press the workpiece edgewise to shape it against the pads 43. The pads 43 and 44 are approximately the same thickness as the workpiece which is to be bent.

Still referring to Fig. 1, the workpiece, after being formed and released, is jerked out by a pluarity of ejector bars 47 which are disposed in slots 48 formed in the lower die. The workpiece moves out on roller supports 49, 50 and drops on end roller supports 51 which are pivoted on standards 52 and adjustably balanced by weights 53. The workpieces are stopped by posts 54 and when their weight comes upon the supports 51 they overbalance the weights 53 and drop down in guides 55 on stack support beams 56. Endless belts 57 carried on the beams move stacks forward as required.

The ejector bars are mounted to tilt and also to reciprocate to lift the article above the forming pads of the lower die and to eject the article. The bars carry pivoted dogs which can be pushed down in the slots beneath the workpieces and which rise to engage the rear edge of the workpiece when the bars are moved rearwardly into energy-storing or cocked position. Springs are provided to constitute the energy-storing means. The bars are moved rearwardly by a lateral movement imparted by the press, as by the horizontal component of movement of the edge-bending die part, and the bars are released to eject the workpiece by another movement of the press.

Figure 5:
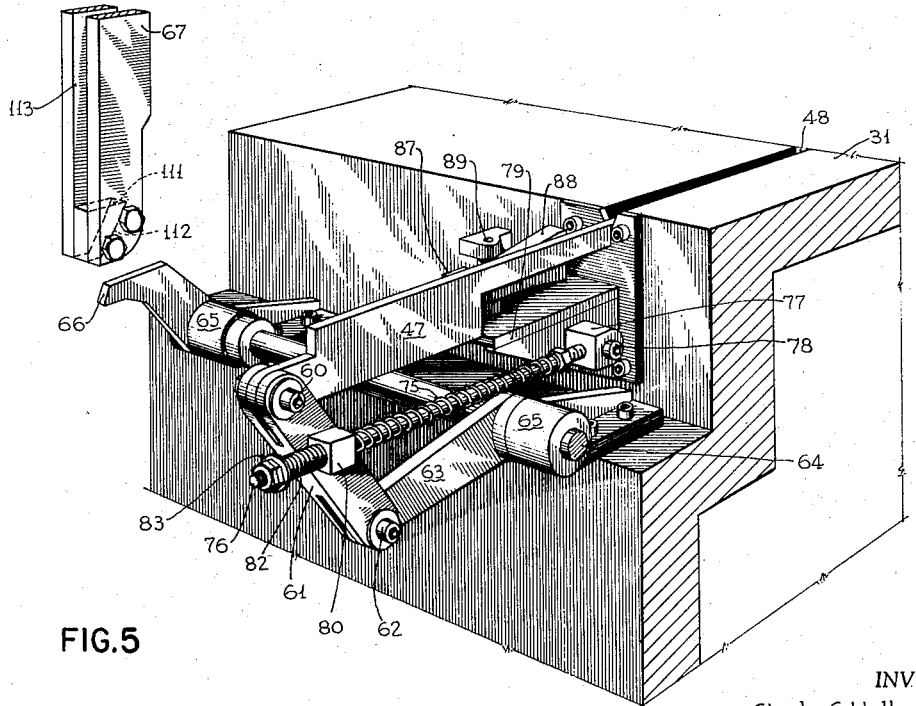
Fig. 5 is a view like Fig. 4 but showing the parts after a workpiece has been discharged.

As here shown, Fig. 1, the two end ejector bars 47 at their outer ends, as shown by Fig. 5, are connected by pivot pins 60 to links 61 which are pivotally connected by pins 62 to arms 63 rigidly mounted on a rock shaft 64 mounted in bearings carried by brackets 65 secured to the base of the press.

Trigger or tripping arms 66 are secured rigidly to the ends of the shaft and have operatively associated with them tripping bars 67 which are carried by arms 68 (shown only in Fig. 1, the other views omitting the adjustable arrangement) which are pivoted by pins 69 to brackets 70 secured to the ram 32. As shown in Figs. 6–12, the arms of the tripping bars 67 are provided with stop means, such as a heel 68a, to engage a surface on the brackets 70 to limit the lower position of the arms. The bars 67 have length adjustment on the arms 68 at a connection 71. The tripping mechanism, including the arms 66 and the bars 67, are disposed clear of the ends of the workpiece when it is being ejected.

Still referring to Fig. 1, there are two ejector bars 47, one near each end of the workpiece. A center bar 47' is provided but this is not active in ejecting the workpiece; it is used only to lift the center of the workpiece and support it as it is passing. The bar 47' is not provided with the link 61 but is rigidly secured, as by welding, to a depending arm 61' which is pivoted to the shaft arm 63. The ejecting mechanism at each end is alike so the mechanism at one end only will be described.

As best shown in Figs. 4, 5 and 13, energy-storing means are provided for the ejector bar, the means here shown comprising a spring 75 which is carried on a plunger rod 76 which is provided at one end with a block 77 pivoted at 78 to a bracket 79 secured to the lower die 31. The rod 76 is slidably mounted intermediate its ends in a guide block 80 pivoted at 81 to an intermediate portion of the link 61. A buffer spring 82 is disposed on the rod 76 between the guide block 80 and a washer-locknut retainer 83 secured to the end of the rod. The power spring 75 acts at one end against the guide block 80 and at its other end against a locking nut 84 threaded on the rod 76 for changing the action of the spring. It is thus seen that the ejector bars can move back and forth and be influenced by the power spring 75 independently of the movement of the rock shaft 64.

As best seen in Figs. 2, 3, 13, 21 and 23, the ejector bar 47 on one side is provided with a latch keeper or latch block 87 adapted to be engaged by a side latch 88 pivoted by a pin 89 to the bracket 79 and pressed toward the bar by a spring 90. Figs. 2 and 13 show the bar in unlatched position and Figs. 3 and 21 show it in latched or cocked position.

As shown in Figs. 16 and 18, the ejector bar 47 at the rear end is provided with a pivot and hold-down pin 93 carrying a roller 94 which rides in an elongated side groove 95. Further up along the bar a dog or detent 96 is pivoted on a pin 97 secured to the bar. The front end of the dog is urged upward by a spring to a position to engage behind the rear edge of a workpiece and the upward movement is limited by a pin 98 carried by the bar.

As shown in Fig. 17, the edge-bending die part 33 is provided with a recess 99 to allow the rear guide and workpiece retainer 42 to rise behind the workpiece.

The means herein shown by which the press mechanism moves the ejector bar rearward is shown in detail in Figs. 13, 16, 19, 21, 23 and 25 and its action as coordinated with press movements may be followed from Figs. 6 to 12. In Fig. 13 it can be seen that the outer or front end of the bar 47 is provided with a notch 102 adapted to be engaged, Fig. 19, by a detent roller 103 carried by a detent plate 104 pivoted on a pin 105 carried by a bracket plate 106 adjustably secured to a bracket 107 carried by the edge-bending die part 33 at a slot and bolt connection 108. The detent plate 104 is urged downward and its lower position is limited by engagement with a stop piece 109.

As shown in Figs. 4 and 5, the tripping bars 67 are provided at the bottom end with a projection 111 adapted to engage the hook-like ends of the arms 66 as the bars rise and with a cam surface 112 which causes the bars to swing out and pass by the ends of the arms 66 when the bars move down. A slot 113 is provided in the bar to embrace the end of the arm 66.

The operation of the ejector mechanism may be followed by reference principally to Figs. 6 to 12. It will be assumed that a workpiece W is in position between the front guides 41 and the rear guides 42. Figs. 14 and 15 show how the workpiece W swings the hinged guides down in passing, how it stops against front guides 41, and how the rear guides 42 rise after the workpiece has passed them.

In Figs. 6 and 13 the ram 32 is in its uppermost position ready to start down. The slidable die part 33 is in its lowermost and innermost position on the ram; the ejector bars 47 are in their outer position; and the workpiece lies upon the dogs 96 of the ejector bars. This is the position shown in Figs. 2 and 5.

In Fig. 7 the ram is moving down and the tripping bars 67 are camming past the ends of the tripping arms 66.

In Figs. 8 and 16 the sliding die part 33 has seated on the workpiece with its pads 44 ready to engage the rear edge of the workpiece and bend it against the lower die pads 43; the detent plate rollers 103 have engaged the tops of the ejector bars 47 to push the plates 104 up; and the projections 111 of the tripping bars 67 have moved on down below the tripping arms 66. The front guides 41 are held down beneath the die part 33 but the rear guides 42 stand up in the recesses 99 of the die part 33 (Fig. 17).

In Figs. 9 and 19 the workpiece has been bent into the shape W1 by the outward horizontal movement of the die part 33 caused by the further downward movement of the ram. The front guides 41 are now disposed beneath the workpiece, their rear ends on top being tapered to permit the front edge of the workpiece to ride over them, and the dogs 96 of the ejector bars 47 have risen behind the rear edge of the workpiece. The detent rollers 103 have also dropped down into the end notches 102 of the ejector bars 47.

In Figs. 10 and 21 the ram is starting to rise but the die part 33 does not at once rise with it; instead the die part 33 moves horizontally inward carrying the ejector bars 47 with it through the action of the detents 104. The workpiece W1 is also moved rearwardly due to the drag of the die part 33 on it until the rearward movement is halted by the rear edge striking the rear guides 42. The springs 75 are compressed and the latches 88 engage behind the latch blocks 87 to hold the stored energy in the springs and keep the ejector bars in a cocked position with their dogs 96 disposed behind the rear edge of the workpiece. This is the position shown in Figs. 3 and 4.

In Figs. 11 and 23 the ram has risen further, carrying the die part 33 up with it until the projections 111 of the tripping bars 67 have engaged the ends of the arms 66 and turned the rock shaft 64 to lift the outer ends of the ejector bars 47, the bars turning about the pins 93 at their inner ends. This lifts the workpiece W1 above the pads 43 of the lower die 31 and above the front guides 41. The workpiece rests against the rear guides 42. The elevation of the front or outer ends of the ejector bars carries the latch block 87 upward relative to the latch 88 and in the Fig. 11 position the bars are at the point of release to snap forward under the impulse of the springs. The detent rollers 103 have moved out of the notches 102 of the ejector bars so they are free to move out.

Figure 25:
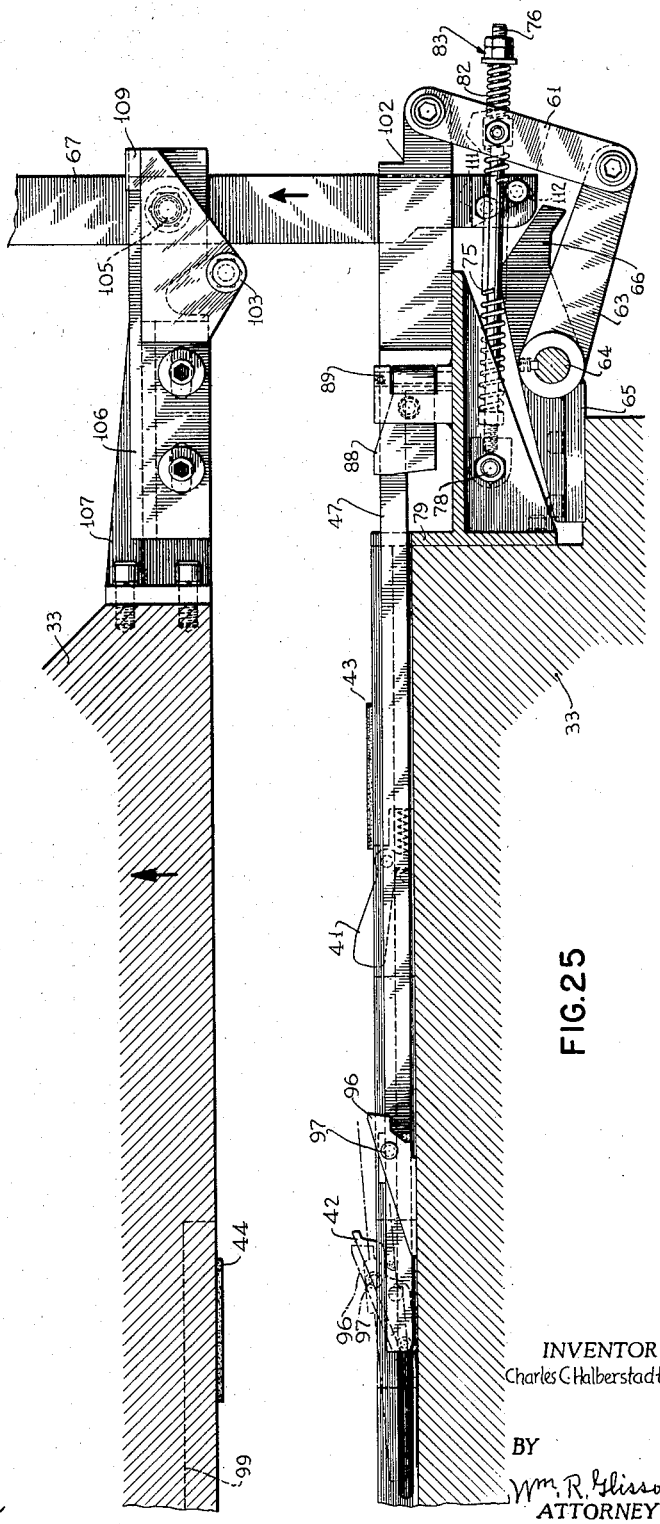
Fig. 25 is a section similar to Fig. 13 but showing the parts in the same position as in Fig. 12.
Figure 26:
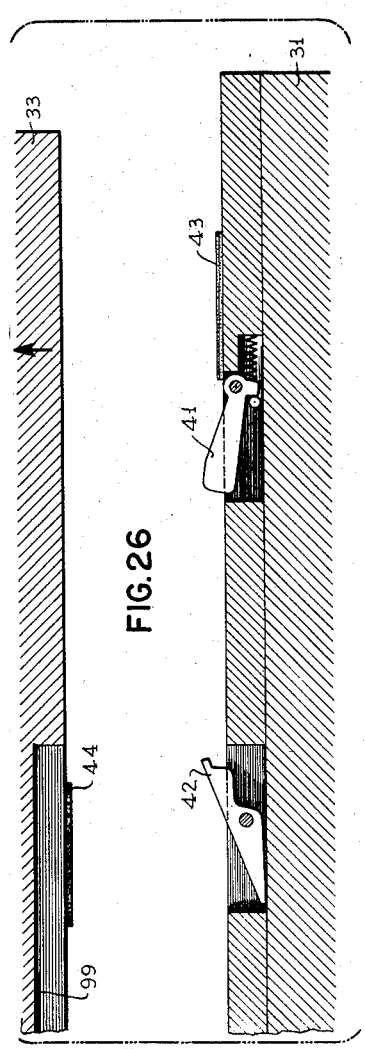
Fig. 26 is a section like part of Fig. 25 but showing the workpiece positioning devices in full lines.

Figs. 12 and 25 show the position of parts after the dogs 96 and ejector bars have thrust the workpiece W1 forward. Fig. 12 shows the workpiece moving out on the roller supports 49 and 50 on its way to the stack. The mechanisms are all returning to their Fig. 6 position by the further upward travel of the ram. A new workpiece may now be fed in between the guides 41 and 42.

It is thus seen that the invention provides simple and dependable apparatus for ejecting articles from a press, the entire action being caused in proper sequence by the movements of the press parts so there is full assurance of the proper action at the proper time. The parts are disposed where they can be readily inspected and repaired. If it is desired to remove articles by hand the automatic ejector apparatus may be quickly cleared for this purpose, most of it being clear of the path of travel of the article anyway.

While one embodiment has been described in detail for purposes of illustration it is to be understood that there may be other embodiments and modifications within the general scope of the invention.

What is claimed is:

1. Article ejecting means for a press, comprising in combination, a fixed lower die, a ram carrying an obliquely movable edge-bending die, a pull-out bar slidably mounted in a slot in the lower die and carrying a hinged dog for engaging the article, a hinged guide in the lower die for limiting the rearward movement of the article, a hold-down pivot for the rear end of the pull-out bar, a link hinged to the front or outer end of the pull-out bar, a rock shaft mounted on the lower die and having an arm hinged to said link, a spring connected to said link intermediate its length, means on said edge-bending die for moving said pull-out bar rearwardly to store energy in said spring, a side latch for said pull-out bar near its outer end to hold it in its rearward cocked position, a tripping arm on said shaft, and a tripping bar hinged on said ram and carrying an element arranged to pass below said tripping arm on its downward movement and to engage it to turn the rock shaft on its upward movement, the turning of said shaft causing the outer end of the pull-out bar to be lifted to raise the article from the lower die and further movement causing the outer end of the pull-out bar to move up above the latch whereby the pull-out bar is jerked outward by the spring to eject the article.

2. Article ejecting means for a press, comprising in combination, a fixed lower die, a ram carrying an obliquely movable edge-bending die, a pull-out bar carrying a hinged dog for engaging the article, a hinged stop guide in the lower die for engaging the rear edge and limiting the rearward movement of the formed article, a link hinged to said bar, a rock shaft having an arm hinged to said link, a spring connected to said link, means on said edge-bending die for moving said bar rearwardly to store energy in said spring, a latch for holding said bar in its rearward cocked position, and means on said ram for turning said shaft and raising the front end of the bar and releasing the latch when the edge-bending die has moved up clear of the article and lower die.

3. Article ejecting means for a press, comprising in combination, a fixed lower die, a ram movable toward and from the lower die, an obliquely movable edge-bending die having vertical and horizontal components of movement mounted on said ram and hanging down below the lower end of the ram when the ram is raised, outwardly biased pull-out bars slidably mounted in said lower die, a pivoted pull-out dog on each of said pull-out bars adapted to engage behind the rear edge of an article formed by said dies, edge guides for limiting the reverse movement of a formed article in the lower die, means on said edge-bending die for engaging said pull-out bars for moving the bars rearwardly as said edge-bending die moves rearwardly as the ram rises after an article is formed, latch means for holding said bars in a rearward position, and means on said ram for releasing said latch means and causing said bars to be moved forwardly to eject an article when the ram moves up further to lift the edge-bending die clear of the article and lower die.

4. Article ejecting means for a press, comprising in combination, a fixed lower die carrying edge-bending elements, a ram movable toward and from the lower die, an edge-bending die mounted for vertical and lateral movement on said ram, said edge-bending die having elements adapted to cooperate with said elements on the lower die and by relative transverse movement to bend an article after said edge-bending die has moved down vertically to rest on the lower die, article ejecting means including an article-engaging means mounted for horizontal movement in said lower die and lying below an article while being formed, energy storing means for actuating said article-engaging means to eject an article, means operated by said edge-bending die during the downward movement of the ram for empowering said energy storing means, latch means for holding said ejecting means in a cocked position and means operated by the action of said ram after the edge-bending die has moved up clear of the formed article and lower die for releasing said latch means and thereby releasing said energy storing means to eject an article.

References Cited in the file of this patent

UNITED STATES PATENTS

| 235,294 | Riesel | Dec. 7, 1880 |
| 1,505,099 | Layman | Aug. 19, 1924 |
| 1,747,463 | Booth | Feb. 18, 1930 |
| 1,797,239 | Newman | Mar. 24, 1931 |
| 2,693,159 | Taylor | Nov. 2, 1954 |

FOREIGN PATENTS

| 191,416 | Germany | Nov. 19, 1907 |